W. H. BURRITT.
PNEUMATIC TIRE.
APPLICATION FILED JULY 29, 1912. RENEWED MAR. 4, 1915.

1,162,749.

Patented Dec. 7, 1915.
3 SHEETS—SHEET 1.

WITNESSES:
Harry A. Beimes.
Fannie E. Weber

INVENTOR.
W<sup>m</sup>. H. Burritt.
BY
ATTORNEY.

W. H. BURRITT.
PNEUMATIC TIRE.
APPLICATION FILED JULY 29, 1912. RENEWED MAR. 4, 1915.

1,162,749.

Patented Dec. 7, 1915.
3 SHEETS—SHEET 2.

WITNESSES:
Harry W. Baines
Fannie E. Weber

INVENTOR.
Wm. H. Burritt.
BY Ernst Pearer
ATTORNEY.

UNITED STATES PATENT OFFICE.

WILLIAM H. BURRITT, OF ST. LOUIS, MISSOURI, ASSIGNOR TO JOSEPHINE T. BURRITT, OF ST. LOUIS, MISSOURI.

PNEUMATIC TIRE.

1,162,749. Specification of Letters Patent. Patented Dec. 7, 1915.

Application filed July 29, 1912, Serial No. 711,998. Renewed March 4, 1915. Serial No. 12,118.

*To all whom it may concern:*

Be it known that I, WILLIAM H. BURRITT, citizen of the United States, residing at St. Louis, State of Missouri, have invented certain new and useful Improvements in Pneumatic Tires, of which the following is a full, clear, and exact description, reference being had to the accompanying drawings, forming a part hereof.

My invention has relation to improvements in pneumatic tires; and it consists in the novel details of construction more fully set forth in the specification and pointed out in the claims.

Figure 1:
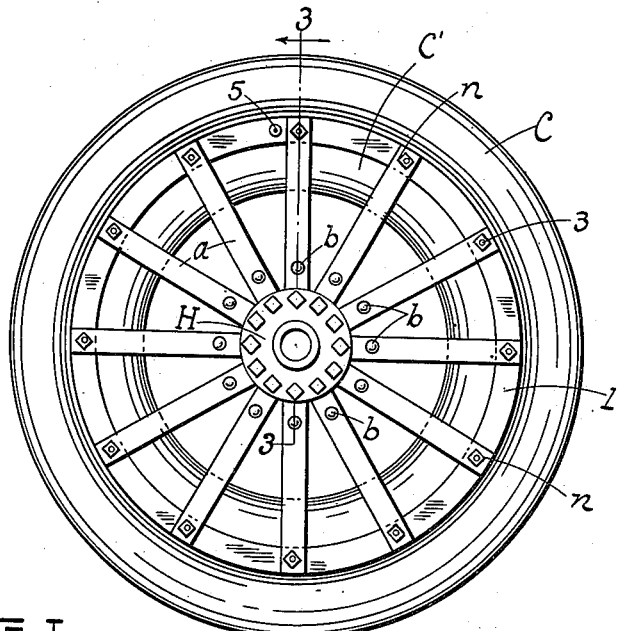
Figure 2:
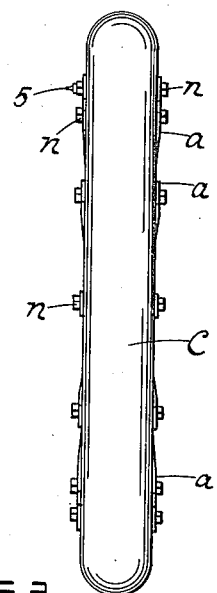
Figure 3:
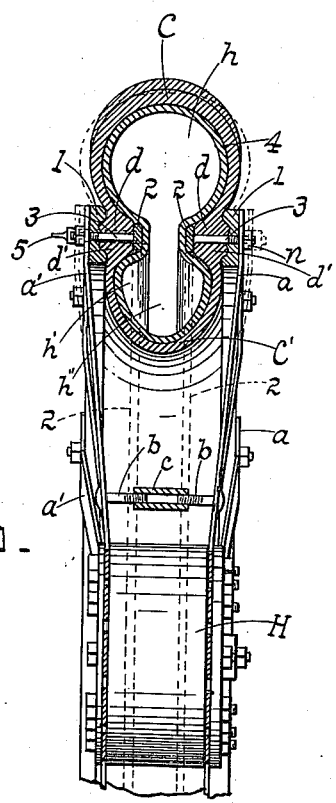
Figure 4:
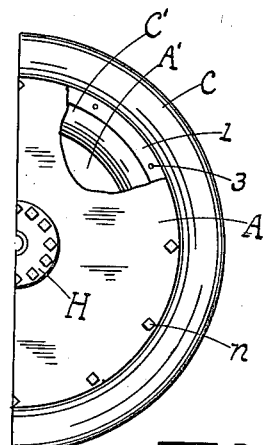
Figure 5:
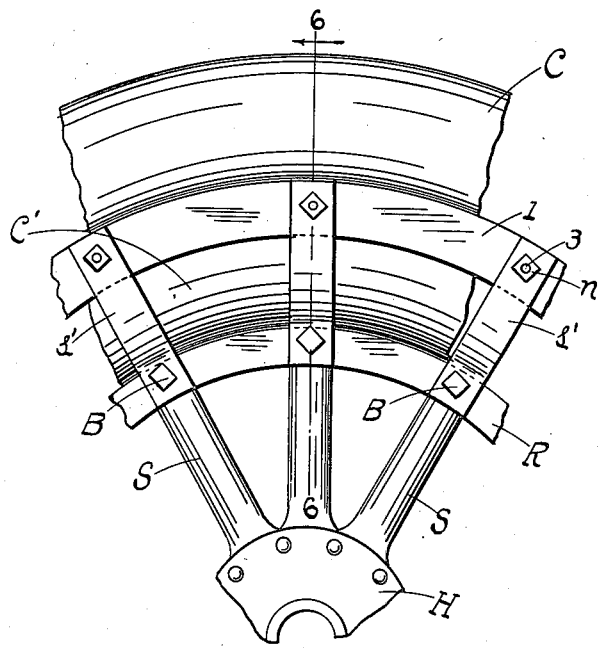
Figure 6:
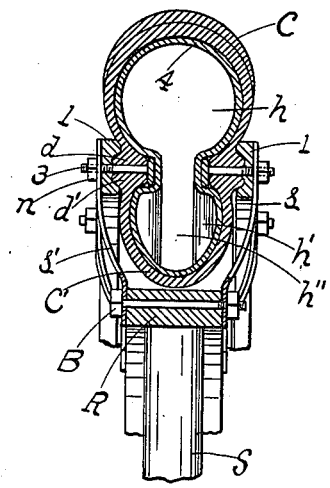
Figure 7:
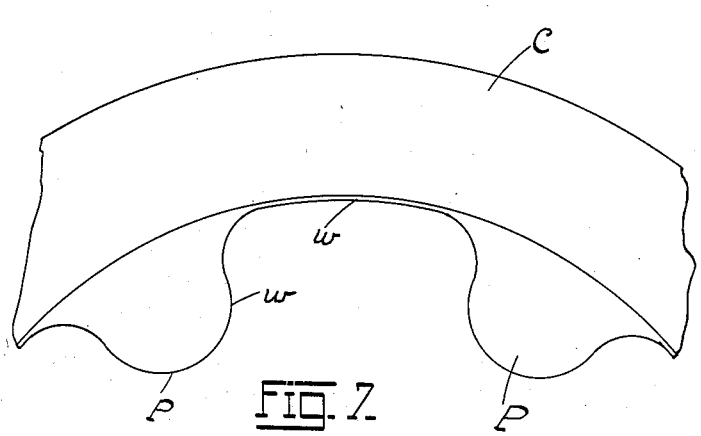
Figure 8:
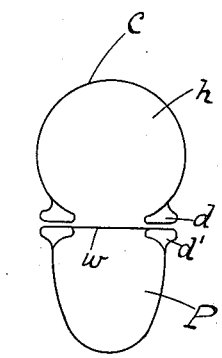
Figure 9:
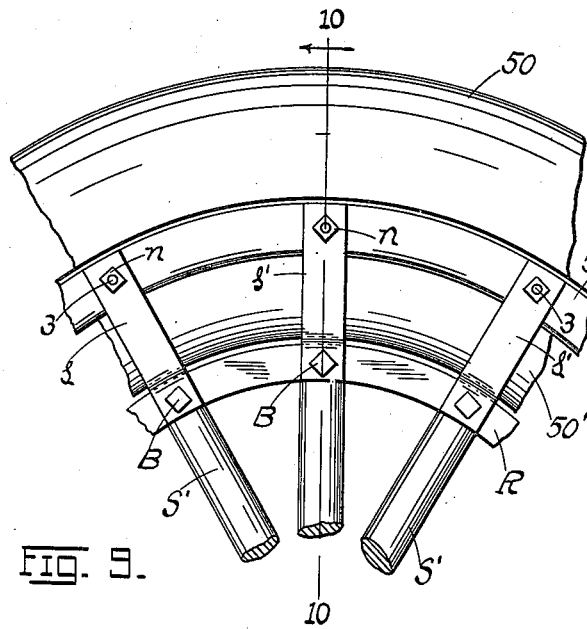
Figure 10:
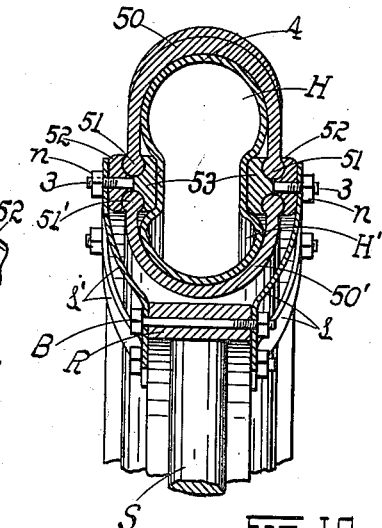
Figure 11:
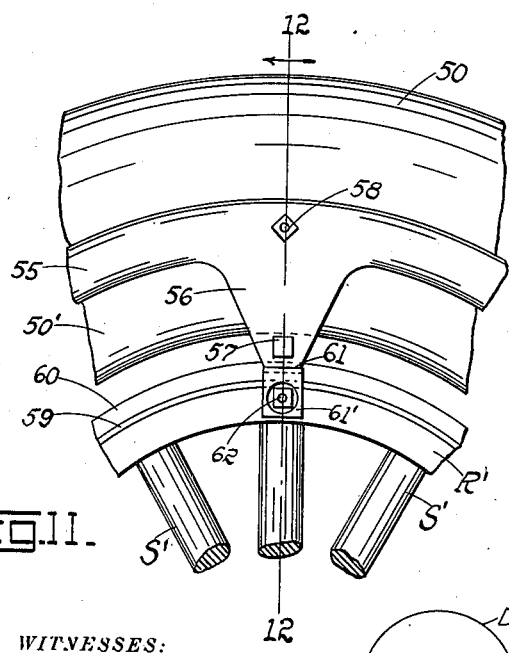
Figure 12:
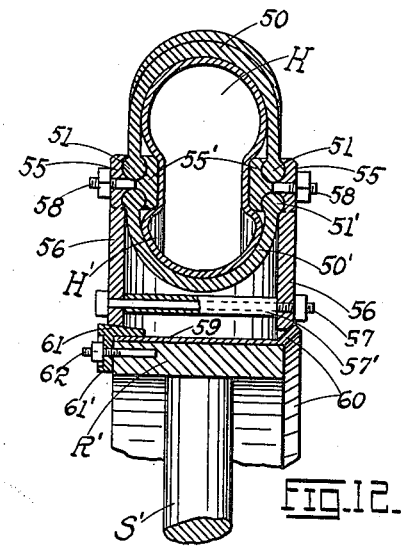
Figure 13:
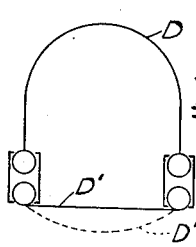

In the drawings, Figure 1 is a side elevation of one form of vehicle wheel showing my invention applied thereto; Fig. 2 is an edge view thereof; Fig. 3 is an enlarged cross-section on the line 3—3 of Fig. 1; Fig. 4 is a side elevation of one-half of a modified form of wheel with my invention applied; Fig. 5 is a side view of a portion of a wheel embodying a still further modification of my invention; Fig. 6 is a cross-section on the line 6—6 of Fig. 5; Fig. 7 is a side diagrammatic view showing a modification of my tire; Fig. 8 is a diagrammatic cross-section of Fig. 7; Fig. 9 is a view similar to Fig. 5, showing a modified form of tire and felly rings therefor; Fig. 10 is a cross-section on the line 10—10 of Fig. 9; Fig. 11 is a view similar to Fig. 9 showing a modified form of tire-support; Fig. 12 is a cross-section on the line 12—12 of Fig. 11; and Fig. 13 is a diagrammatic cross-section of a still further modification of the tire.

The object of my invention is to construct a pneumatic tire in which the air (or equivalent cushioning fluid) shall be so distributed as to accord to the walls of the outer casing a perfect and unrestrained freedom of movement, the yielding character of said walls allowing for an extended and perfect distribution of the air when subjected to material compression from a sudden blow resulting from the passage of the wheel over irregular surfaces such as rocks, stones and the like, the freedom of such distribution being due to the specific disposition of the inner inflatable tube section relative to the points of support of the outer casing. In the ordinary pneumatic tire both the inner inflatable tube and outer casing are disposed exteriorly to the rim or felly of the wheel, the cross-section of the tire being substantially circular. Under a heavy load the side walls of the bottom of the casing become distended laterally, the compressed air within having no means of escape, the tension of the air body so compressed being communicated immediately to said walls and to a maximum degree at points directly over the surface on which the wheel is running. The bulging of the walls at this particular point is due to the fact that the weight of the vehicle is focused at this point. With the rotation of the wheel these distended sides stretch the fabric outwardly and away from the tread which is held down between the load and the ground, producing a crawling motion of the duck laterally, which in time pulls the tread away from the duck. Besides, if the tire is not sufficiently inflated, the bulging and bending of the side walls will gradually break the strands of thread in the duck, causing blow outs and the like. This deterioration results from the limited yielding character of the casing-walls, to overcome which requires a certain amount of energy or power and hence directly affects the efficiency of the motor and thereby reduces the horse power available for driving the vehicle. With my invention there results a perfect yielding or response of the casing walls to the load imposed thereon, and hence the motor or engine has its energy or efficiency conserved for the legitimate purpose of propelling the vehicle. It follows that a steep hill or high grade can be negotiated with my improved tire with a minimum waste of energy, due to the fact that only a negligible fraction of the horse power of the engine need be diverted to overcome the resistance of distributed distention of the casing walls, the compressed air distributing itself substantially throughout the entire chamber of the inflatable tube instead of remaining confined locally to practically that portion of the tire which is in contact with the ground,—an objection inherent in the ordinary tire. In my invention the chamber confining the cushioning fluid (or air) extends circumferentially partially inward or toward the rotation axis of the wheel, from the points of support of the tire (or outer casing) and partially outward from the said points of support or from the rotation axis. These points of support may be compared in position to the felly or rim of the ordinary wheel as will be apparent from a detailed description which is to follow. The invention too, offers many advantages flowing directly from the specific disposition and formation of the tire as a whole. Among these advantages are the ease and comfort of riding, the tire possessing the qualities of absorbing all shocks; and by virtue of the disposition of the intercommunicating chambers which compose the inner inflatable tube confined within the tire casings, no rebound of the air so compressed is possible, and hence no jolting results to the occupants of the car. The car therefore, rides easy and without tremor or shock to the occupants.

In detail the invention may be described as follows: Referring to the drawings, and for the present to Figs. 1 to 4 inclusive, H represents the hub of a vehicle wheel, from which radiate two sets or series of resilient spokes $a$, $a'$, disposed substantially in planes parallel to the plane of rotation of the wheel, the spokes of one set being opposite to those of the adjacent set, the spokes of each opposing pair being connected by right and left hand threaded bolts, $b$, $b$, connected by a turnbuckle nut $c$, whereby they may be adjusted to and from each other, it being understood that the spokes are of spring steel so as to yield more or less in planes parallel to the rotation axis of the wheel. In lieu of "spokes" I may substitute disks A, A', of suitable springy material which would be a full equivalent of the spokes, as shown in the modification in Fig. 4. To the free ends of each set of spokes are secured an outer felly ring 1, and an inner felly ring 2 the latter having disposed along one face thereof (that facing the ring 1) a series of stems 3 terminally screw-threaded, the threaded ends being passed through the ring 1 and provided with securing nuts $n$. The inner adjacent faces of the rings 1, 2, are preferably (though not necessarily) shaped to conform to the usual clencher bead of casings of pneumatic tires, the rings in the present case confining between them an outer casing C of a construction conforming in all essential particulars to the ordinary pneumatic tire casing, and an inner casing C' differing only in that it is not provided with a layer corresponding to the tread of the casing C. The clencher beads $d$, $d'$, of the two casings are brought into abutting or contiguous relation as shown (Fig. 3) and the stems or bolts 3 by which the rings 1 and 2 are drawn together at the same time serve to secure the casings C, C'. Thus juxtaposed, the casings C, C', form a single chamber which receives an inflatable tube or sack 4 to which leads a check-valve casing 5 for purposes of inflation, through the outer ring 1. The rings 1, 2, are here termed "felly rings" corresponding as they do in position to the felly or rim of the ordinary wheel, though in the present instance they likewise perform the function of a clencher ring by means of which automobile tires are usually held in place on the rim or felly. The casings C, C', may be regarded as a single casing (composed of an outer section C serving as the tread, and an inner section C') enveloping an inner inflatable tube 4 provided with an outer air chamber $h$ identified with the outer section C, and an inner extension $h'$ of said chamber identified with the inner section C', the two chambers being in permanent communication through the neck portion $h''$, but for practical purposes forming a single chamber (Fig. 3). The inner chamber extension $h'$ is thus disposed between the rotation axis of the wheel and the points of support of the casing (these points of support being the securing bolts 3) or the said chamber ($h'$) may be said to extend inwardly from the felly rings toward the axis of the wheel, the outer chamber $h$ extending outwardly from the felly rings and from the axis of the wheel. In other words, a portion of the air chamber of the tire may be said to extend toward the hub of the wheel from the rim or felly, another (or the outer) portion being disposed exteriorly to the rim as in the ordinary vehicle wheel. The walls of this composite chamber are free to yield under a load or a blow in practically all directions owing to the springy character of the spokes $a$, $a'$, (or their equivalent), it being apparent (Fig. 3), that under a heavy load the free ends of the spokes $a$, $a'$, will flex outwardly in response to the pressure exerted on the side walls of the tire (C, C', 4) by the tension of the air (or other gas) confined in the sack 4, this tension distributing itself substantially half way around the wheel, the air being squeezed from the outer section $h$ and forced into the inner section $h'$, thus imposing on the side walls of the casing (C, C') a minimum degree of distention and reducing the vibration or shock to the car.

In the forms described no provision is made for the support of the inner or basal wall of the inner casing C', but in Figs. 5 and 6 I make provision for arresting such wall against an undue inward expansion of said casing. In that case I construct the wheel with short centrally disposed spokes S provided with a rim or felly R to engage the convex wall of the casing C' in the event of undue dilation, the casings C, C', being secured between the resilient spoke extensions or forks $s$, $s'$, the fixed ends of which are fastened to the rim R by means of bolts B. In other respects the construction is the same as in the first form described, corresponding parts being represented by the same reference symbols.

The chamber extension $h'$ need not of course, be annular or coextensive with the outer chamber $h$, and in lieu of a continuous chamber $h'$ I may substitute a series of independent or individual chambers or pockets P formed from a web of suitable material $w$, the open portions of the outer casing C between the pockets being sealed by the web as shown in the modified form of tire illustrated diagrammatically in Figs. 7 and 8. In all the cases, however, the chambers $h'$, P, form inwardly extending enlargements of the outer chamber $h$ identified with the outer tread casing C. The latter when worn may be readily removed and replaced by a new casing, the inner casing lasting indefinitely.

It is obvious that the invention is susceptible of many modifications; and although the improvement is primarily directed to the tire, it is obvious that the wheel must likewise be specifically constructed to accommodate the new tire, thereby resulting in a new combination of wheel and tire. In the form covered by Figs. 5 and 6, the rim R does not secure the casing C' as would be the case in the ordinary wheel felly, but merely acts as a bearing or support to afford a rest for the casing C' when under maximum distention.

With the possible exception of Fig. 8, the foregoing forms represent the chambers $h$, $h'$, connected by a neck $h''$ more or less contracted; but I may adopt casings 50, 50', substantially U-shaped in cross-section as represented in the modifications illustrated in Figs. 9, 10, 11, 12, where the constriction between the chambers H, H', of the respective casings is negligible. In Figs. 9, 10, the casings are shown with annular cylindrical clencher beads 51, 51', held in position between rings 52, 53, bolted together at the outer terminals of the spoke extensions $s$, $s'$, very much on the order shown in Figs. 5 and 6, such parts in Figs. 9 and 10 as correspond to parts in Figs. 5 and 6 being designated by corresponding reference characters.

In Figs. 11 and 12 I show a wheel in which the outer section carrying the tire is detachable as a unit from the inner section. This outer section comprises an outer pair of felly rings 55 provided with integral lobes 56, opposing lobes being connected by bolts 57; and an inner pair of felly rings 55' united by bolts 58 to the outer rings, the beads 51, 51' of the casings 50, 50' (these being similar to those shown in Figs. 9, 10) being gripped between the rings. This outer unit can be slipped over and fastened to the inner wheel section by the following mechanism:—The rim R' surrounding the spokes S' of the inner wheel section is provided with a band 59 one edge of which is provided with an outwardly inclined flange or abutment 60 against which the loges 56 on one side of the outer wheel section may bear when such outer section is slipped over the band 59. Between the lobes on the opposite side and the band are inserted wedges 61 which when once firmly driven in place are then secured to the rim by screw-bolts 62 passed through the brackets 61' formed on the wedges. By detaching the wedges at any time, it is obvious that the entire outer section with its tire may be slipped off the rim R', or more properly, off the band 59 carried thereby. Preferably the bolts 57 are provided with spacing thimbles or casings 57' extending between the lobes 56 on opposite sides of the wheel.

A distinct inner casing such as C', 50', or pocket P, may not always be indispensable under my invention; and I may simply provide an outer casing D as shown in the diagrammatic view in Fig. 13, the open side of which may be spanned by an elastic web or wall D' which, when the outer casing is subjected to material compression, will yield or expand inwardly or toward the axis of the wheel, as illustrated by the dotted position in said figure, such distention of said member D' creating in effect an extension chamber which in a measure subserves the function of distinct chambers as $h'$, H', and P. In all the forms of tire illustrated, however, the casing (which incloses the inner inflatable tube or sack) is supported not by the felly or rim inclosed within the tire, but is supported by devices engaging the sides of the casing. This construction results in what may be termed a "suspended" tire, because the tire as a whole is in effect suspended between lateral supports which may (as described) or may not be yielding in lines parallel to the rotation axis of the wheel. The principle of the side support or "suspended" tire need not of course, be restricted in its application to "pneumatic" tires.

Having described my invention, what I claim is:—

1. In combination with a vehicle-wheel provided with a hub, spokes radiating from said hub in two distinct planes spaced apart, an outer felly ring at the free ends of the series of spokes, an inner felly ring at the free ends of the series of spokes, an outer casing projecting beyond the peripheral surface defining the limits of the free ends of the spokes, an inner casing having its edges brought into contiguous relation to the corresponding edges of the outer casing and projecting interiorly from the aforesaid peripheral surface, an inflatable tube incased by the two casings, and means for securing the casings to the respective felly rings.

2. In combination with a vehicle-wheel provided with a hub, spokes radiating from said hub in two distinct planes spaced apart, an outer felly ring at the free ends of the series of spokes, an inner felly ring at the free ends of the series of spokes, an outer casing projecting beyond the peripheral surface defining the limits of the free ends of the spokes, an inner casing having its edges brought into contiguous relation to the corresponding edges of the outer casing and projecting interiorly from the aforesaid peripheral surface, means for securing the casings to the respective felly rings, and inflatable means inside the casings for maintaining the latter against collapse.

3. In combination with a vehicle wheel provided with a hub, resilient spokes radiating from said hub in two distinct planes spaced apart, an outer felly ring at the free ends of the series of spokes, an inner felly ring at the free ends of the series of spokes an outer casing projecting beyond the peripheral surface defining the limits of the free ends of the spokes, an inner casing having its edges brought into contiguous relation to the corresponding edges of the outer casing and projecting interiorly from the aforesaid peripheral surface, an inflatable tube incased by the two casings, and means for securing the casings to the respective felly rings.

4. In combination with a vehicle-wheel provided with a hub, members radiating from said hub in two distinct planes spaced apart, outer and inner felly rings disposed in pairs at the outer ends of each set of members, and spaced apart, an outer casing projecting beyond the peripheral surface defining the limits of the free ends of said members, an inner casing having its edges brought into contiguous relation to the corresponding edges of the outer casing and projecting interiorly from the aforesaid peripheral surface, and means for securing the casings to the respective felly rings.

5. In combination with a vehicle-wheel, members disposed radially thereon on opposite sides of a medial plane parallel to the plane of rotation of the wheel, outer and inner felly rings disposed in pairs at the outer ends of each set of members and spaced apart, an outer casing projecting beyond the peripheral surface defining the limits of the free ends of said members, an inner casing having its edges brought into contiguous relation to the corresponding edges of the outer casing and projecting interiorly from the aforesaid peripheral surface, and means for securing the casings to the respective felly rings.

In testimony whereof I affix my signature, in presence of two witnesses.

WILLIAM H. BURRITT.

Witnesses:
EMIL STAREK,
FANNIE E. WEBER.